Figure 1:
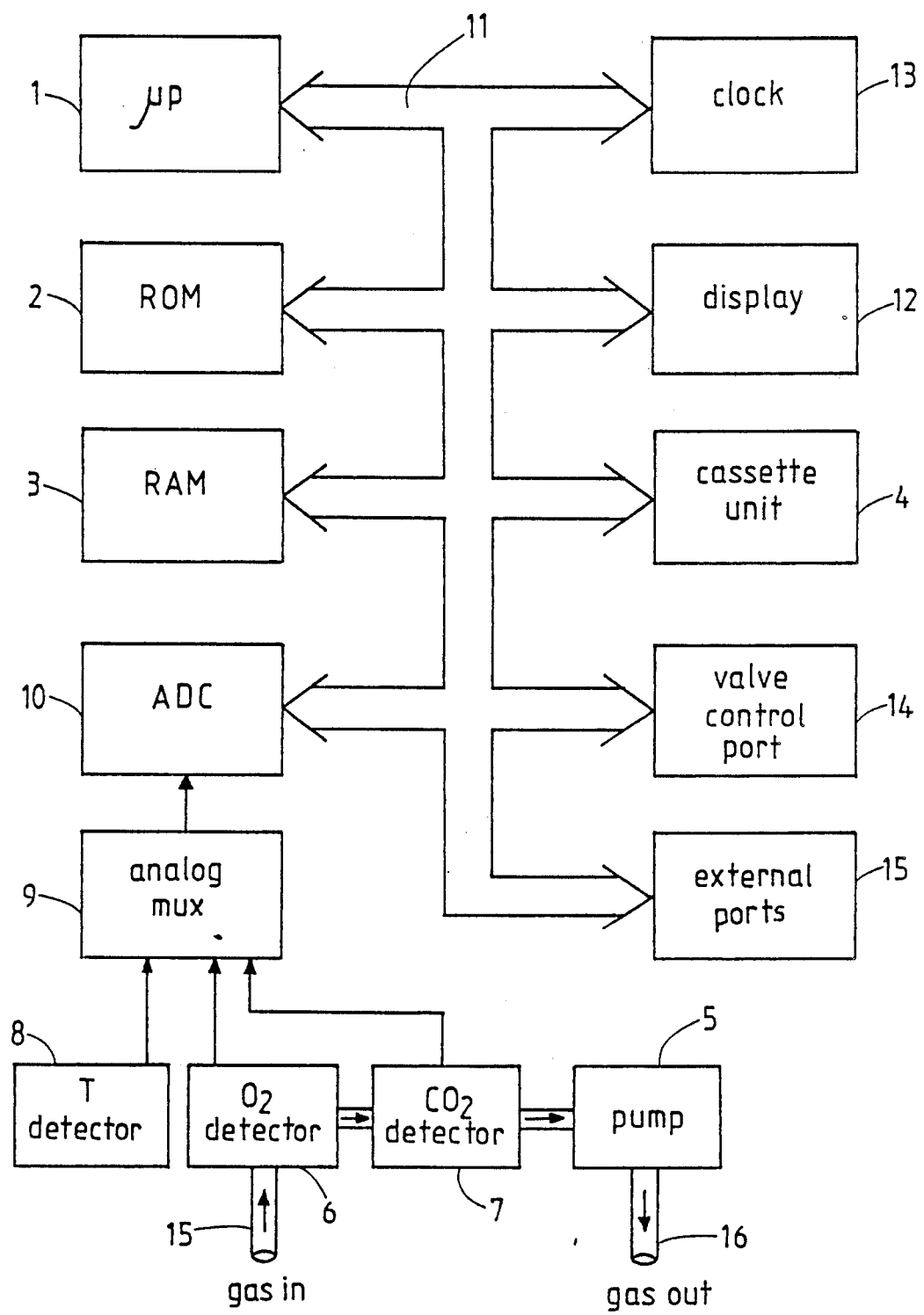

United States Patent [19]

Harris

[11] Patent Number: 4,987,745

[45] Date of Patent: Jan. 29, 1991

[54] CONTROLLED ENVIRONMENT TRANSPORTATION OF RESPIRING COMESTIBLES

[75] Inventor: Samuel Harris, Northcote, New Zealand

[73] Assignee: Transfresh Corporation, Salinas, Calif.

[21] Appl. No.: 385,282

[22] Filed: Jul. 25, 1989

[30] Foreign Application Priority Data

Jul. 29, 1988 [NZ] New Zealand .................. 225620

[51] Int. Cl.⁵ .................................... F24F 3/16
[52] U.S. Cl. ................................ 62/78; 426/418; 426/419
[58] Field of Search .............. 62/78; 426/418, 419

[56] References Cited

U.S. PATENT DOCUMENTS

| | | | |
|---|---|---|---|
| 4,537,043 | 8/1985 | Volker | 62/78 |
| 4,566,282 | 1/1986 | Knoblauch et al. | 62/78 |
| 4,642,996 | 2/1987 | Harris et al. | 62/239 |
| 4,685,305 | 8/1987 | Burg | 62/78 |
| 4,716,739 | 1/1988 | Harris et al. | 62/78 |
| 4,817,391 | 4/1989 | Roe et al. | 62/78 |
| 4,833,892 | 5/1989 | Wassibauer et al. | 62/78 |

Primary Examiner—Ronald C. Capossela

[57] ABSTRACT

A method of transporting a quantity of a comestible which may be subject to degradation as a result of respiration during transportation, comprising the steps of: (a) sealing or substantially sealing said quantity of the respiring comestible within a container as hereinbefore described sufficiently to ensure that less oxygen of the ambient air can diffuse into the container than is required for full respiration by the respiring comestible, flushing the container with an oxygen low or oxygen free gas so as to provide a reduced oxygen level in the sealed or substantially sealed container, such flushing occurring before, during and/or after said sealing or substantial sealing, and (b) transporting the container with the respiring comestible therein while (i) monitoring the oxygen level within said container and automatically adjusting the oxygen level as necessary by a positive infusion of ambient air into the container in response to such monitoring towards an optimum or predetermined value or range of values and (ii) monitoring the carbon dioxide level within said container and adjusting the carbon dioxide level as necessary in response to such monitoring towards an optimum or predetermined value or range of values without reliance upon flushing with an oxygen low or oxygen free gas, said adjustment being firstly by means of a scrubbing of the air within said container but if necessary may additionally or instead include a positive infusion of ambient air into the container.

17 Claims, 3 Drawing Sheets

CONTROLLED ENVIRONMENT TRANSPORTATION OF RESPIRING COMESTIBLES

The present invention relates to improvements in and/or relating to the carriage of comestibles and/or plants whether cut or not (hereinafter simply "comestibles") and in particular to apparatus applicable thereto including but not limited to containers and related means and methods.

In New Zealand Patent Specification No. 205453 (U.S. Pat. No. 4,642,996, Australian Pat. No. 567966 and other equivalents thereto) there is disclosed a system utilising shipping containers whereby the respiring comestible is loaded into a container, the container is then sealed sufficiently to ensure that less oxygen from ambient air can diffuse into the container than is required for respiration by the comestible, flushing the container (preferably with a nitrogen rich gas) to reduce the oxygen level in the container atmosphere below that of the ambient air and transporting the container while monitoring at least the carbon dioxide and oxygen levels (and preferably also the temperature) within the container and adjusting as necessary, (a) the oxygen content by positive infusion of ambient air into the container in response to such monitoring towards an optimum or predetermined value or range of values, (b) the carbon dioxide content by absorbing carbon dioxide from the atmosphere in the container in response to such monitoring towards an optimum or predetermined value or range of values and (c) the temperature, if monitored, by refrigeration in response to such monitoring towards an optimum or predetermined value or range of values.

The present invention recognises that the system disclosed in the aforementioned patent specifications (the content of which are hereby incorporated by way of reference) can further be improved, in particular in relation to control of the carbon dioxide presence in the container.

It is also recognised that while a system in accordance with the present invention is most appropriate for use with shipping "containers" where there is a wish to obviate the need for the transportation of pressurised or liquefied gases therewith, such a system is equally appropriate in other carriage spaces, eg. the cargo hold of an aircraft, ship, train or the like and therefore for the purposes of the present specification the word "container" as used herein relates not only to shipping containers but to any means defining a storage space for such comestibles.

In a system such as disclosed in the aforementioned patent specifications the quantity of carbon dioxide capable of being absorbed is finite where reliance is placed upon a finite amount of a carbon dioxide absorbing medium such as, for example, a scrubbing unit including hydrated lime. Moreover there is also the prospect of carbon dioxide build up where for some reason or another a flow of the gaseous environment of the container can not be ducted through any such carbon dioxide scrubbing device.

It is therefore an object of the present invention to provide a method and related apparatus which will provide some safeguard in the event the carbon dioxide content of the container rises above a desirable level.

Accordingly the present invention, in one aspect, consists in a method of transporting a quantity of a comestible which may be subject to degradation as a result of respiration during transportation, comprising the steps of:

(a) sealing or substantially sealing said quantity of the respiring comestible within a container as hereinbefore described sufficiently to ensure that less oxygen of the ambient air can diffuse into the container than is required for full respiration by the respiring comestible, flushing the container with an oxygen low or oxygen free gas so as to provide a reduced oxygen level in the sealed or substantially sealed container, such flushing occurring before, during and/or after said sealing or substantial sealing, and (b) transporting the container with the respiring comestible therein while (i) monitoring the oxygen level within said container and automatically adjusting the oxygen level as necessary by a positive infusion of ambient air into the container in response to such monitoring towards an optimum or predetermined value or range of values and (ii) monitoring the carbon dioxide level within said container and adjusting the carbon dioxide level as necessary in response to such monitoring towards an optimum or predetermined value or range of values without reliance upon flushing with an oxygen low or oxygen free gas, said adjustment being firstly by means of a scrubbing of the air within said container but if necessary may additionally or instead include a positive infusion of ambient air into the container.

Preferably said container is refrigerated and there is automatic adjustment of the temperature.

In a further aspect the present invention consists in apparatus for transporting a quantity of respiring comestibles which may be degraded by respiration, said apparatus comprising:

transportable means defining a volume of a gaseous environment for said comestibles capable of being substantially sealed and in which the comestibles to be transported can be carried, means to seal or substantially seal said volume after loading with said comestibles such that less oxygen from the ambient air can diffuse into the environment than is required for the respiration, means to enable flushing of the environment with an oxygen free or low gas to reduce the oxygen content thereof below that of ambient air, means to monitor the oxygen content of the environment, means to monitor the carbon dioxide content of the environment, means responsive to the means to monitor said oxygen content to cause a positive infusion of ambient air into the environment should the oxygen content be or fall below a predetermined value, means responsive to the means to monitor said carbon dioxide content to cause passage of gas within the environment through means to scrub at least some of the carbon dioxide therefrom should carbon dioxide content rise above a first predetermined value, and means responsive to the means to monitor said carbon dioxide content to cause a positive infusion of ambient air into the environment should said carbon dioxide content not be maintained below a higher second predetermined value by said means to scrub at least some carbon dioxide from the environment.

Preferably said apparatus includes means to monitor the temperature of the environment and additionally means responsive to the means to monitor the temperature of the environment to adjust at least downwardly the temperature of the environment towards a predetermined value.

Figure 2:
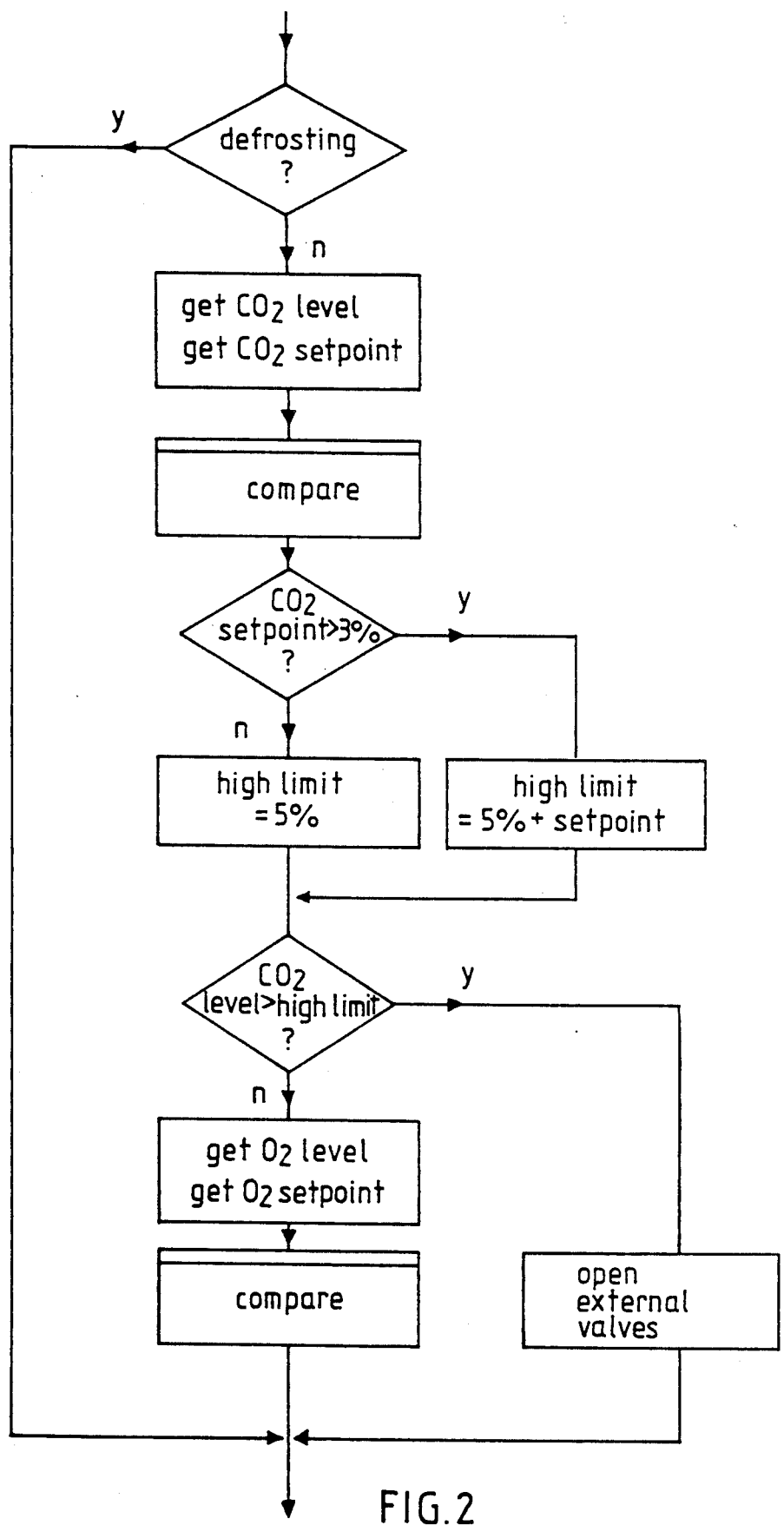
Figure 3:
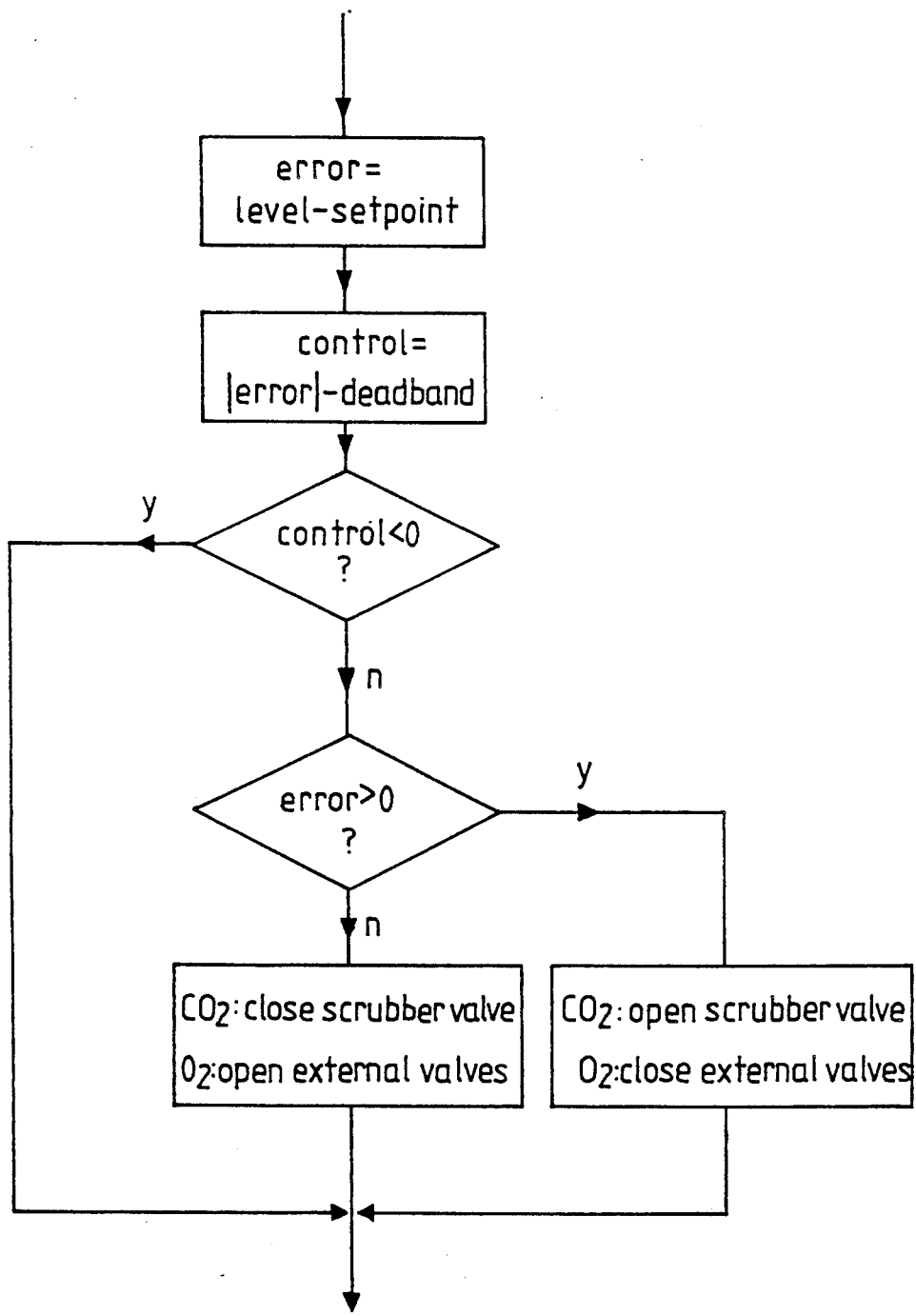

One preferred form of the present invention will now be described with reference to the accompanying drawing in which:

FIG. 1 is a block diagram of a controller which may be used to implement the present invention, and FIGS. 2 and 3 are flow diagrams for portions of the controller microprocessor program.

The controller hereinafter described is now preferred to be used in connection with the container systems described in the aforementioned specifications, particularly with reference to FIGS. 1-7 of those specifications, as a replacement for the controller described in relation to FIGS. 8-10 of those specifications. Such figures and the description thereof is hereby herein incorporated by way of reference.

The controller is a microprocessor based unit which measures, controls, displays and logs the levels of carbon dioxide and oxygen in a container as hereinbefore defined, particularly a refrigerated marine shipping container. Control of the gas levels may be achieved via solenoid valves built into the container and connected to the controller. In the case of $CO_2$, values are provided to (i) allow passage of container air through a scrubber unit in order to prevent the $CO_2$ level of the container air rising above a predetermined level, and (ii) allow an infusion of ambient air to the container should the $CO_2$ level rise above a higher predetermined level, such as in the event of failure of the scrubber action. In the case of $O_2$, the external valves of (ii) allow an infusion of ambient air to the container in order to prevent the $O_2$ level of the container air from falling below a predetermined level. The controller is intended to be portable and of a size and shape to fit in the electrical power control box of such containers.

Referring to FIG. 1, the controller schematically comprises a microprocessor 1 which operates according to a program stored in read-only memory 2. The microprocessor reads and writes to and from read/write memory 3 and a removable cassette in cassette unit 4. A gas pump 5 continuously draws air from the container through inlet 15 and consecutively through $O_2$ detector 6 and $CO_2$ detector 7. Outlet 16 may return the sampled air to the container or its surroundings. A temperature detector 8 monitors approximately the temperature of the controller itself. Analog multiplexer 9 passes any of the three detector output signals to analog-to-digital converter 10 in response to commands by the microprocessor. The selected detector signal is then passed to the microprocessor on a common data/address bus 11.

Microprocessor 1 calculates actual $CO_2$ and $O_2$ levels by applying corrections to the detected levels as necessary depending on the detectors used. The $CO_2$ and $O_2$ levels according to the most recent sample are then shown on display 12, and may at suitable intervals be stored on the cassette, in addition to the detected temperature and the time according to real time clock 13. The microprocessor compares the actual $CO_2$ and $O_2$ levels with predetermined setpoints, these being preferred levels which vary with particular comestibles. Action of the container valves is controlled by the the $O_2$ level and setpoint are being compared, a positive error indicates that the level is above the setpoint and the external valve should be closed, while a negative error indicates that the level is undesirably low and the external valves should be opened or remain open.

Principal features of a specific embodiment of the invention will now be described. In this embodiment the microprocessor 1 is an Intel 8085 8-bit processor. The other components of the controller shown in FIG. 1 interface with the data/address bus via an 8255 programmable peripheral interface, except that the external ports 15 include an 8251 programmable communications interface for connection of the controller to a further microprocessor if desired. The ROM 2 in which the microprocessor program is stored comprises two 32K 2732 EPROMS while the RAM 3 comprises a 2K 6116 static RAM. The analog multiplexer 9 and analog-to-digital converter 10 comprise 4051 and ADC0802 chips respectively. The setpoints for a particular container load are stored in the cassette after input from a portable computer via the 8251 interface as noted above, and the controller cannot exercise the routine of FIG. 2 unless the cassette is in place. Deadband values ($O_2$: ±0.3%, $CO_2$: ±0.5%) are stored in the EPROMS and are not varied between loads.

A "Teledyne"* type A5 microfuel cell detects oxygen in the container air up to 25% by volume and with 10% accuracy of reading. The cell output is temperature dependent for which compensation is achieved via a thermistor in the cell output circuit.

A four filament "Gowmac"* thermal conductivity cell is used to detect the presence of carbon dioxide in the container air up to 25% by volume. Each filament of the detector comprises one arm of a That part of the microprocessor program which enacts the present invention will now be described with reference to the flow charts of FIGS. 2 and 3.

In FIG. 2, action may be taken in respect of the container $CO_2$ and $O_2$ levels, provided that the container is not undergoing defrosting. The microprocessor then proceeds to compare the $CO_2$ level with the $CO_2$ setpoint and then with the $CO_2$ high limit value. If the $CO_2$ high limit is exceeded, ambient air is drawn into the container to lower the container air $CO_2$ level, otherwise the $O_2$ level is compared with the $O_2$ setpoint. $CO_2$ high limit control thus overrides $O_2$ level control. In making each comparison and operating valves if necessary, program execution passes to the routine shown in FIG. 3.

Referring to FIG. 3, the microprocessor calculates an error equal to the deviation of the $CO_2$ or $O_2$ level from the corresponding setpoint, and calculates a control value equal to the error magnitude less the deadband amplitude. If the control value is negative the error is within the deadband and the existing valve status is maintained. If the control value is positive, the error is outside the deadband and action may be taken as follows. If the $CO_2$ level and setpoint are being compared, a positive error indicates that the level is undesirably high and the scrubber valve should be opened or remain open, while a negative error indicates that the level is below the setpoint and the scrubber valve should be closed or remain closed. If resistance bridge, two filaments being used for gas measurement and two filaments for reference. Such a detector is not intrinsically $CO_2$ sensitive but also reflects the $O_2$ and $NO_2$ levels of the container air. The microprocessor therefore compensates the conductivity cell output according to the detected $O_2$ level and an estimate of the $N_2$ level The $CO_2$ detector is also temperature dependent for which further compensation is made by the microprocessor via the output of temperature detector 8. Overall, the $CO_2$ level obtained with 1% accuracy.

A "Wisa"* vibrator type pump draws container air through the detectors at 0.2–0.5 1/minute. The air is filtered before passage through the $CO_2$ detector.

Each detector output is read by the microprocessor approximately once every second and a running average for each level is calculated to overcome noise, the detector outputs being compensated as noted previously. The latest averages are displayed on the front panel of the controller and compared with the setpoints. The container $CO_2$ and $O_2$ levels and controller temperature are recorded on the cassette approximately every 8 hours when the container and controller are in use. There is provision to monitor and record the temperature within the container through a further communications port in the container, not shown in FIG. 1, if desired.

Appendix I is a portion of an 8085 assembly language program listing in which lines 222–335 correspond approximately to the flow chart of FIG. 2.

Appendix II is a portion of an 8085 assembly language program listing in which lines 1134–1168 carry out $CO_2$ level compensation for the $CO_2$ detector temperature, lines 1177–1200 carry out $CO_2$ level compensation in accord with the $O_2$ level, and lines 1219–1272 correspond approximately to the flow chart of FIG. 3.

It is believed that apparatus and methods in accordance with the present invention define widespread application in the transportation industry.

Teledyne Analytical Instruments, Box 1580, City of Industry, CA 91749 USA
Gowmac USA, Box 32, NJ 08805 USA
Wisa Precision Pumps, Bayonne, NJ 07002 USA

APPENDIX 1

SIS-II 8080/8085 MACRO ASSEMBLER, V4.1        TFCVF
TRANSFRESH 300 SERIES CONTROLLER

```
LOC    OBJ           LINE        SOURCE STATEMENT

00C0   CD0506    C   214             CALL   LOG
00C3   AF            215             XRA    A
00C4   326400    D   216             STA    LOGF    ;AND RESET LOG FLAG
                     217
                     218  ; COMPENSATE AND SCALE INPUTS
00C7   CDA006    C   219  MAIN1:     CALL   TFCMP
                     220
                     221  ; CONTROL OUTPUTS
00CA   3A0430        222             LDA    PORTA
00CD   47            223             MOV    B,A
00CE   E620          224             ANI    DFRST   ;DEFROSTING?
00D0   CAA801    C   225             JZ     DPPTR   ;YES, EXIT
                     226
00D3   78            227             MOV    A,B
00D4   E680          228             ANI    CART    ;CARTRIDGE INSERTED
00D6   C2A801    C   229             JNZ    DPPTR   ;NO, EXIT
                     230
                     231  ; DO CONTROL ACTION ON CO2
00D9   110A40        232             LXI    D,ESPCO2 ;GET CO2 SET POINT
00DC   CD1E08    C   233             CALL   SPCV    ;CONVERT
                     234
00DF   012300    D   235             LXI    B,TCO2  ;CO2 VALUE
00E2   113300    D   236             LXI    D,TMP   ;SET POINT
00E5   214300    C   237             LXI    H,DBCO2 ;DEADBAND
00E8   3E00          238             MVI    A,0     ;NEGATIVE CONTROL ACTION
00EA   CDDB07    C   239             CALL   CTLA
                     240
00ED   DA0201    C   241             JC     CON3
00F0   79            242             MOV    A,C
00F1   B7            243             ORA    A
00F2   3A0530        244             LDA    PORTB
00F5   CAFD00    C   245             JZ     CON1
00F8   E6FB          246             ANI    NOT RYCO2
00FA   C3FF00    C   247             JMP    CON2
00FD   F604          248  CON1:      ORI    RYCO2
00FF   320530        249  CON2:      STA    PORTB
                     250
0102   213300    D   251  CON3:      LXI    H,TMP   ;CLEAR TEMP
0105   0604          252             MVI    B,4
0107   CD0000    E   253             CALL   CLRM
                     254
                     255  ;CHECK CO2 LIMIT
```

```
010A 110A40        256            LXI     D,ESPCO2 ;GET CO2 SET POINT
010D CD1E08   C    257            CALL    SPCV     ;CONVERT
                   258
                   259 ;     SET POINT < 3%
0110 013300   D    260            LXI     B,TMP    ;SET POINT
0113 114F00   C    261            LXI     D,PC3    ;- 3%
0116 213700   D    262            LXI     H,TMP+4
0119 CD0000   E    263            CALL    SUB32
011C 3A3A00   D    264            LDA     TMP+7    ;GET SIGN BIT
011F 0F           265            RRC              ;-VE
0120 DA3501   C    266            JC      CON4     ;YES, SET TO 5%
                   267
                   268 ;    > 3%  SET POINT = SET POINT + 5%
0123 013300   D    269            LXI     B,TMP    ;SET POINT =
0126 115300   C    270            LXI     D,PC5    ;SET POINT +
0129 213600   D    271            LXI     H,TMP+3  ;5%
012C CD0000   E    272            CALL    ADD32
012F 113600   D    273            LXI     D,TMP+3  ;-> SETPOINT + 5%
0132 C33801   C    274            JMP     CON5
                   275
                   276 ;    < 3%  SET POINT = 5%
0135 115300   C    277 CON4:      LXI     D,PC5    ;-> 5%
                   278
0138 012300   D    279 CON5:      LXI     B,TCO2   ;-> CO2 COMPENSATED
013B 214B00   C    280            LXI     H,PC1    ;-> DEADBAND
013E 3E00         281            MVI     A,0      ;CONTROL +VE
0140 CDDB07   C    282            CALL    CTLA
                   283
                   284 ;     DO CONTROL ACTION
0143 DA5801   C    285            JC      CON6     ;ACTION REQUIRED, NO ->
0146 79           286            MOV     A,C      ;ON OR OFF
0147 B7           287            ORA     A
0148 3A0530       288            LDA     PORTB    ;GET PORT
014B CA5301   C    289            JZ      CONA     ;OFF ->
014E E6FD         290            ANI     NOT RYTB ;LIMIT OFF
0150 C35501   C    291            JMP     CONB
0153 F602         292 CONA:      ORI     RYTB     ;LIMIT ON
0155 320530       293 CONB:      STA     PORTB
                   294
0158 3A0530       295 CON6:      LDA     PORTB    ;CHECK LIMIT
015B E602         296            ANI     RYTB     ;LIMIT SET?
015D CA6801   C    297            JZ      CONC     ;NO, CONT
0160 3A0530       298            LDA     PORTB    ;GET PORT AGAIN
0163 F601         299            ORI     RYO2     ;YES, SET RYO2
0165 320530       300            STA     PORTB
0168 C3A801   C    301            JMP     DPPTR    ;NEXT FUNCTION
                   302
016B 213300   D    303 CONC:      LXI     H,TMP    ;CLEAR TEMP
016E 0608         304            MVI     B,8
0170 CD0000   E    305            CALL    CLRM
                   306
                   307 ;DO CONTROL ACTION ON OXYGEN
0173 110E40       308            LXI     D,ESPO2  ;OXYGEN SET POINT
0176 CD1E08   C    309            CALL    SPCV     ;CONVERT
                   310
                   311 ;POINT TO APPROPIATE O2 CELL FOR CONTROL
0179 210B00   D    312            LXI     H,AO2A   ;-> O2A
017C 3A6900   D    313            LDA     O2CF     ;FLAG SET?
017F B7           314            ORA     A
0180 CA8601   C    315            JZ      CON7     ;NO, CONT
                   316
0183 210F00   D    317            LXI     H,AO2B   ;YES, POINT TO REF
                   318
0186 44           319 CON7:      MOV     B,H      ;H,L -> O2 VALUE TO USE
0187 4D           320            MOV     C,L      ;TRANSFER TO B,C
```

```
0188 113300    D   321         LXI     D,TMP       ;-> O2 SET-POINT
018B 214700    C   322         LXI     H,DBO2      ;-> O2 DEAD BAND
018E 3EFF          323         MVI     A,0FFH
0190 CDDB07    C   324         CALL    CTLA
                   325
0193 DAA801    C   326         JC      DPPTR
0196 79            327         MOV     A,C
0197 B7            328         ORA     A
0198 3A0530        329         LDA     PORTB
019B CAA301    C   330         JZ      CON8
019E E6FE          331         ANI     NOT RYO2
01A0 C3A501    C   332         JMP     CON9
01A3 F601          333 CON8:   ORI     RYO2
01A5 320530        334 CON9:   STA     PORTB
                   335
                   336 ; SET DISPLAY POINTERS TO CO2 AND O2
01A8 112300    D   337 DPPTR:  LXI     D,TCO2      ;-> CO2 AVERAGE
01AB 210B00    D   338         LXI     H,AO2A      ;-> O2A AVERAGE
01AE 3A6900    D   339         LDA     O2CF        ;O2 CONTROL FLAG
01B1 B7            340         ORA     A           ;SET?
01B2 CAB801    C   341         JZ      KPR         ;YES, LEAVE OA2
01B5 210F00    D   342         LXI     H,AO2B      ;NO, CHANGE TO O2B
                   343
                   344 ; ANY KEYS PRESSED
01B8 3A6500    D   345 KPR:    LDA     KEYF
01BB B7            346         ORA     A
01BC CA1F02    C   347         JZ      MAIN3       ;NO, CONT
                   348
                   349 ; NOW SEE WHICH KEY
01BF 3A0630        350         LDA     PORTC       ;GET KEY
01C2 E60F          351         ANI     0FH         ;STRIP UPPER
01C4 210B00    D   352         LXI     H,AO2A      ;-> O2A
01C7 110F00    D   353         LXI     D,AO2B      ;-> O2B
01CA FE0D          354         CPI     SWP1        ;O2A & O2B REQUIRED?
01CC CA0902    C   355         JZ      KPR1        ;YES, JUMP OUT
01CF 211300    D   356         LXI     H,AT1       ;NO, -> TEMP 1
01D2 111700    D   357         LXI     D,AT2       ;-> TEMP 2
01D5 FE07          358         CPI     SWP3
01D7 CA0902    C   359         JZ      KPR1
01DA 212700    D   360         LXI     H,TT4       ;TEMPS 3 & 4
01DD 111B00    D   361         LXI     D,AT3
01E0 FE0B          362         CPI     SWP4
01E2 CA0902    C   363         JZ      KPR1
01E5 B7            364         ORA     A           ;KEY RELEASED?
01E6 CA0902    C   365         JZ      KPR1        ;YES, EXIT
01E9 213300    D   366         LXI     H,TMP       ;CLEAR TEMP
01EC 0608          367         MVI     B,8
01EE CD0000    E   368         CALL    CLRM
01F1 110E40        369         LXI     D,ESPO2     ;O2 SET POINT
01F4 CD1E08    C   370         CALL    SPCV        ;CONVERT
01F7 3A3400    D   371         LDA     TMP+1       ;GET VALUE
01FA 323800    D   372         STA     TMP+5
01FD 110A40        373         LXI     D,ESPCO2    ;O2 SET POINT
0200 CD1E08    C   374         CALL    SPCV
0203 213700    D   375         LXI     H,TMP+4
0206 113300    D   376         LXI     D,TMP
                   377
                   378 ; KEY PRESSED
06FF 35            1120        DCR     M
0700 C2B106    C   1121        JNZ     AVRG
                   1122
0703 3EFF          1123        MVI     A,0FFH      ;SET FIRST TIME FLAG
0705 326A00    D   1124        STA     FIRSTF
                   1125
                   1126 ;NOW COMPENSATE THE AVERAGE VALUES
```

```
                1127 ;EXPAND TEMPERATURE SCALE
0708 011F00   D 1128 TFC2:   LXI     B,AT4     ;AVERAGE TEMP
070B 11B307   C 1129         LXI     D,THR     ; X 3 =
070E 212700   D 1130         LXI     H,TT4     ;TRUE TEMPERATURE
0711 CD0000   E 1131         CALL    MUL32
                1132
                1133 ;COMPENSATE CO2 FOR TEMPERATURE
0714 012700   D 1134         LXI     B,TT4     ;DELTA T
0717 11CB07   C 1135         LXI     D,K4
071A 213D00   D 1136         LXI     H,TMP1
071D CD0000   E 1137         CALL    SUB32
                1138
0720 013D00   D 1139         LXI     B,TMP1    ;DELTA T X 200
0723 11CF07   C 1140         LXI     D,K5
0726 213300   D 1141         LXI     H,TMP
0729 CD0000   E 1142         CALL    MUL32
                1143
072C 010700   D 1144         LXI     B,AC02    ;CO2A X 1000
072F 11D307   C 1145         LXI     D,K6
0732 212300   D 1146         LXI     H,TCO2
0735 CD0000   E 1147         CALL    MUL32
                1148
0738 012300   D 1149         LXI     B,TCO2    ;(CO2A X 1000)
073B 113300   D 1150         LXI     D,TMP     ;- ((TT4 - 64000) X 200)
073E 212300   D 1151         LXI     H,TCO2
0741 CD0000   E 1152         CALL    SUB32
                1153
0744 013D00   D 1154         LXI     B,TMP1    ;(TT4 - 64000)/569
0747 11D707   C 1155         LXI     D,K7
074A 213D00   D 1156         LXI     H,TMP1
074D CD0000   E 1157         CALL    DIV32
                1158
0750 01D307   C 1159         LXI     B,K6      ;1000 - (DELTA T - 64000)
0753 113D00   D 1160         LXI     D,TMP1    ; -----------------
0756 213D00   D 1161         LXI     H,TMP1    ;       569
0759 CD0000   E 1162         CALL    SUB32
                1163
075C 012300   D 1164         LXI     B,TCO2    ;A - 0.2(DELTA T)
075F 113D00   D 1165         LXI     D,TMP1    ;------------------
0762 212300   D 1166         LXI     H,TCO2    ; 1 - 0.0045(DELTA T)
0765 CD0000   E 1167         CALL    DIV32
                1168
                1169 ;COMPENSATE CO2 FOR O2 CONCENTRATION
0768 010B00   D 1170         LXI     B,AO2A    ;-> O2A
076B 3A6900   D 1171         LDA     O2CF      ;GET APPROPIATE
076E B7         1172         ORA     A         ;O2 READING
076F CA7507   C 1173         JZ      AVG1
0772 010F00   D 1174         LXI     B,AO2B
                1175
                1176 ;COMPENSATE CO2 DATA
0775 11BB07   C 1177 AVG1:   LXI     D,TEN     ;O2 / 10
0778 213D00   D 1178         LXI     H,TMP1
077B CD0000   E 1179         CALL    DIV32
                1180
077E 012300   D 1181         LXI     B,TCO2    ;CO2 + O2/10
0781 113D00   D 1182         LXI     D,TMP1
0784 213D00   D 1183         LXI     H,TMP1
0787 CD0000   E 1184         CALL    ADD32
                1185
078A 013D00   D 1186         LXI     B,TMP1    ;(CO2 + O2/10) - 2(UNITS)
078D 11AF07   C 1187         LXI     D,TWOU
0790 213D00   D 1188         LXI     H,TMP1
0793 CD0000   E 1189         CALL    SUB32
                1190
0796 013D00   D 1191         LXI     B,TMP1    ;(CO2 - 2 + O2/10)
```

```
0799 11B707      C  1192            LXI      D,NINE      ;----------------
079C 213D00      D  1193            LXI      H,TMP1      ;        9
079F CD0000      E  1194            CALL     DIV32
                    1195
07A2 013D00      D  1196            LXI      B,TMP1      ;(CO2 - 2 + O2/10) X 10/9
07A5 11BB07      C  1197            LXI      D,TEN
07A8 212300      D  1198            LXI      H,TCO2
07AB CD0000      E  1199            CALL     MUL32
                    1200
07AE C9             1201            RET
                    1202
07AF 7C14           1203 TWOU:      DW       5244,0      ;TWO (UNITS)
07B1 0000
07B3 0300           1204 THR:       DW       3,0         ;THREE
07B5 0000
07B7 0900           1205 NINE:      DW       9,0         ;NINE
07B9 0000
07BB 0A00           1206 TEN:       DW       10,0        ;TEN
07BD 0000
07BF ED17           1207 K1:        DW       6125,0      ;CONSTANT 1
07C1 0000
07C3 3958           1208 K2:        DW       22585,0     ;CONSTANT 2
07C5 0000
07C7 1000           1209 K3:        DW       16,0        ;CONSTANT 3
07C9 0000
07CB 00FA           1210 K4:        DW       64000,0     ;CONSTANT 4
07CD 0000
07CF 1400           1211 K5:        DW       20,0        ;CONSTANT 5
07D1 0000
07D3 E803           1212 K6:        DW       1000,0      ;CONSTANT 6
07D5 0000
07D7 3902           1213 K7:        DW       569,0       ;CONSTANT 7
07D9 0000
                    1214
                    1215 ;***************************************************
                    1216
                    1217 ;CLTA:-              CONTROL ACTION SUBROUTINE
                    1218.
                    1219 ;ENTER: BC -> INPUT VARIABLE
                    1220 ;       DE -> SET-POINT VALUE
                    1221 ;       HL -> DEADBAND VALUE
                    1222 ;       A = CONTROL ACTION, 00=+VE, FF=-VE
                    1223
                    1224 ;EXIT:  CARRY, NO ACTION ERROR<DEDBAND
                    1225 ;       C = ACTION 00(OFF), FF(ON)
                    1226
                    1227 ;---------------------------------------------------
                    1228
07DB F5             1229 CTLA:      PUSH     PSW         ;SAVE ACTION
07DC E5             1230            PUSH     H           ;SAVE DEADBAND POINTER
                    1231
                    1232            ;ENTERS WITH BC, DE SET
07DD 213300      D  1233            LXI      H,TMP       ;ERROR
07E0 CD0000      E  1234            CALL     SUB32
                    1235
07E3 AF             1236            XRA      A           ;RESET
07E4 326800      D  1237            STA      NEGF        ;NEGATIVE FLAG
                    1238
07E7 213600      D  1239            LXI      H,TMP+3
07EA 7E             1240            MOV      A,M         ;ERROR -VE?
07EB 07             1241            RLC
07EC D2FA07      C  1242            JNC      $+14        ;NO, ->
07EF 3EFF           1243            MVI      A,0FFH      ;YES,
07F1 326800      D  1244            STA      NEGF        ;NEGATIVE FLAG
07F4 213300      D  1245            LXI      H,TMP
```

```
07F7 CD0000    E  1246          CALL    COMPHL      ;MAKE POSITIVE
                  1247
07FA 013300    D  1248          LXI     B,TMP       ;ERROR
07FD D1           1249          POP     D           ;DEADBAND
07FE 213300    D  1250          LXI     H,TMP       ; CONTROL REQUIRED
0801 CD0000    E  1251          CALL    SUB32
                  1252
0804 3A3600    D  1253          LDA     TMP+3       ;ERROR < DEADBAND?
0807 07           1254          RLC
0808 C1           1255          POP     B           ;GET ACTION
0809 D8           1256          RC                  ;ERROR < DEADBAND, RETURN
080A 78           1257          MOV     A,B
080B B7           1258          ORA     A           ;ACTION + OR -
080C CA1108    C  1259          JZ      $+5         ;ACTION +,RETURN WITH 00H
080F 3EFF          1260         MVI     A,OFFH      ;ACTION -,RETURN WITH OFFH
0811 4F           1261          MOV     C,A         ;PUT ACTION IN C
                  1262
0812 3A6800    D  1263          LDA     NEGF        ;WAS ERROR -VE?
0815 B7           1264          ORA     A
0816 CA1C08    C  1265          JZ      $+6         ;NO, ->
0819 79           1266          MOV     A,C         ;YES, COMPLEMENT
081A 2F           1267          CMA
081B 4F           1268          MOV     C,A
                  1269
081C AF           1270          XRA     A           ;CLEAR ACTION FLAG
081D C9           1271          RET
                  1272
                  1273 ;-----------------------------------------
```

What is claimed is:

1. A method of transporting a quantity of at least one respiring comestible selected from plants, fruits and vegetables comprising the steps of:
loading a quantity of said at least one respiring comestible into a container;
sealing the container sufficiently to insure that less oxygen from ambient air can diffuse into the container than is required for respiration by said quantity and sufficient to insure production of carbon dioxide by said quantity as a result of the respiration greater than can diffuse from the container;
flushing the container with a gas low in oxygen concentration to reduce the oxygen concentration in the container atmosphere; and
transporting the container, including the quantity of respiring comestible, while monitoring the oxygen concentration and carbon dioxide concentration within the container and adjusting, as necessary, the oxygen level within the container by a positive infusion of ambient air into the container in response to said monitoring toward a desired value or range of values and monitoring the carbon dioxide level as necessary in response to said monitoring toward a desired value or range of values by positive infusion of ambient air into the container.

2. The method of claim 1 further comprising adjusting the carbon dioxide concentration within the container by first absorbing carbon dioxide from the atmosphere in the container, unless the means for said absorbing is substantially depleted of its absorbing capacity.

3. The method of claim 1 or claim 2 wherein said container is refrigerated, and includes means for adjusting the temperature in the container during said transporting.

4. The method of claim 1 wherein said refrigeration is monitored to avoid freezing said quantity; wherein the oxygen content is maintained in the range of about 1% to about 10% by volume; and wherein the carbon dioxide content is maintained in the range of 0% to about 10% by volume.

5. The method of claim 1 where the comestible is plant matter, fruit matter, vegetable matter, or a combination of two or more of plant, fruit and vegetable matter.

6. The method of claim 3 wherein said temperature is maintained above the freezing point of the comestible.

7. The method of claim 1 where the oxygen content is adjusted to be in the range of 1% to 10% by volume.

8. The method of claim 1 where the carbon dioxide content is adjusted to be in the range of 0% to 10% by volume.

9. A method of transporting a quantity of comestible which may be subject to degradation as a result of respiration during transportation comprising the steps of:
sealing a container of respiring comestible within a container sufficiently to insure that less oxygen from ambient air can diffuse into the container than is required for respiration by the respiring comestible and sufficiently to insure a production of carbon dioxide by the respiring comestible as a result of the respiration greater than can diffuse from the container;
flushing the container with a nitrogen-rich gas to reduce the oxygen level in the container atmosphere;
transporting the container with the respiring comestible therein while monitoring the oxygen level within said container and adjusting the oxygen level as necessary by a positive infusion of ambient air into the container in response to such monitoring towards an optimum or predetermined value or range of values; and
monitoring the carbon dioxide level within said container and adjusting the carbon dioxide level as necessary in response to such monitoring towards an optimum or predetermined value or range of values, said adjusting being effected by scrubbing the atmosphere within sad container and, if necessary, secondly, by infusing ambient air into said container.

10. The method of claim 9 further comprising also monitoring the temperature within said container and adjusting the temperature as necessary in response to said monitoring towards an optimum or predetermined value or range of values.

11. A method of transporting a quantity of comestible which may be subject to degradation as a result of respiration during transportation comprising the steps of:
sealing a container of respiring comestible within a container sufficiently to insure that less oxygen from ambient air can diffuse into the container than is required for respiration by the respiring comestible and sufficiently to insure a production of carbon dioxide by the respiring comestible as a result of the respiration greater than can diffuse from the container;
reducing the oxygen level in the container atmosphere;
transporting the container with the respiring comestible therein while monitoring the oxygen level within said container and adjusting the oxygen level as necessary by a positive infusion of ambient air into the container in response to such monitoring towards an optimum or predetermined value or range of values; and
monitoring the carbon dioxide level within said container and adjusting the carbon dioxide level as necessary in response to such monitoring towards an optimum or predetermined value or range of values, said adjusting being effected by scrubbing the atmosphere within said container and, if necessary, secondly, by infusing ambient air into said container.

12. The method of claim 11 further comprising also monitoring the temperature within said container and adjusting the temperature as necessary in response to said monitoring towards an optimum or predetermined value or range of values.

13. A shipping container adapted for having a quantity of at least one respiring comestibles selected from plants, fruit and vegetables disposed and sealed therein sufficient to insure that less oxygen from the ambient air can diffuse into the container than is required for respiration by said quantity and sufficient to insure a production of carbon dioxide by said quantity greater than can diffuse from the container;
means to monitor oxygen content within said container;
means to monitor carbon dioxide content within said container;
means responsive to the means to monitor the oxygen content within the environment of said container to cause a positive infusion of ambient air into said container if the oxygen level within the environment falls below a predetermined value; and
means responsive to the means for monitoring the carbon dioxide content within the environment of said container, including means for causing a positive infusion of ambient air into the environment when the carbon dioxide concentration rises above a first predetermined value.

14. The apparatus of claim 13 further comprising means responsive to the means for monitoring the carbon dioxide concentration in the container environment to cause the passage of gases within the environment through means to scrub at least some carbon dioxide from said atmosphere if the carbon dioxide concentration rises above a predetermined value or range o values that is lower than said first predetermined value or range of values.

15. The apparatus of claim 13 or claim 14 further comprising means for monitoring the temperature of the environment and means responsive to the means for monitoring the temperature of the environment to adjust the temperature of the environment towards a predetermined value or range of values.

16. A gas controller for a shipping container adapted for having a quantity of respiring comestible selected from plants, fruits and vegetables disposed and sealed therein sufficient to insure that less oxygen from the ambient air can diffuse into the container than is required for respiration by said quantity and sufficient to insure a production of carbon dioxide by said quantity that can diffuse from the container, said container including means for extracting carbon dioxide from the container atmosphere and means for exchanging ambient air with said container atmosphere including:
a microprocessor, read-only memory and read-write memory connected to a communication bus;
a carbon dioxide detector for detecting the concentration of carbon dioxide in the container atmosphere;
an oxygen detector for detecting the concentration of oxygen in the container atmosphere;
means for connecting the output of said detectors to said bus; and
an output port connected to said bus for output from said microprocessor of control signals which control said means for extracting and said means for exchanging;
said microprocessor being adapted to execute a program which:
monitors said carbon dioxide concentration and said oxygen concentration;
controls means for said extracting;
controls means for said exchanging; and
controls means for positive infusion of air into said container.

17. The gas controller of claim 16 wherein the means for controlling positive infusion of air comprise solenoid valves.

* * * * *